(12) United States Patent
Johnson et al.

(10) Patent No.: US 9,089,172 B2
(45) Date of Patent: *Jul. 28, 2015

(54) LIGHTWEIGHT, DURABLE APPAREL AND LAMINATES FOR MAKING THE SAME

(71) Applicant: W. L. Gore & Associates, Inc., Newark, DE (US)

(72) Inventors: Matthew A. Johnson, Bear, DE (US); Edward C. Gunzel, Oxford, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/804,751

(22) Filed: Mar. 14, 2013

(65) Prior Publication Data

US 2013/0198927 A1    Aug. 8, 2013

Related U.S. Application Data

(62) Division of application No. 12/465,383, filed on May 13, 2009.

(51) Int. Cl.
*B32B 5/18* (2006.01)
*A41D 3/04* (2006.01)
*B32B 5/24* (2006.01)
(Continued)

(52) U.S. Cl.
CPC *A41D 3/04* (2013.01); *A41D 27/00* (2013.01); *B32B 5/24* (2013.01); *D06P 1/90* (2013.01); *A41D 31/02* (2013.01); *B32B 37/1284* (2013.01); *B32B 38/145* (2013.01); *B32B 2037/243* (2013.01); *B32B 2305/18* (2013.01); *B32B 2307/73* (2013.01); *B32B 2327/18* (2013.01); *B32B 2377/00* (2013.01);
(Continued)

(58) Field of Classification Search
CPC ..... A41D 3/00; A41D 13/00; A41D 2400/00; A41D 2400/22; B32B 5/026; B32B 2305/182; B32B 2305/186; B32B 2307/554; B32B 2307/712; B32B 2307/724; D06N 2209/105; D06N 2209/121; D06N 2209/123; D06N 2209/145; D06N 2209/1685
USPC ................... 442/59, 76, 77, 79, 80
See application file for complete search history.

(56) References Cited

U.S. PATENT DOCUMENTS 3,586,596 A   6/1971   Ainsworth et al.
3,953,566 A   4/1976   Gore
(Continued)

FOREIGN PATENT DOCUMENTS

CN   2546479   4/2003
CN   1785077   6/2006
(Continued)

OTHER PUBLICATIONS

PCT/US2010/001145, International Search Report, Jul. 20, 2010, 6 pages.
(Continued)

*Primary Examiner* — Peter Y Choi
(74) *Attorney, Agent, or Firm* — Amy L. Miller

(57) ABSTRACT

Laminates are described having a durable outer film surface for use in making lightweight liquidproof articles of apparel, such as outerwear garments. A method of making the laminate and a lightweight outerwear garment having an abrasion resistant exterior film surface is described.

13 Claims, 2 Drawing Sheets

(51) Int. Cl.
  *D06P 1/92* (2006.01)
  *A41D 27/00* (2006.01)
  *A41D 31/02* (2006.01)
  *B32B 37/12* (2006.01)
  *B32B 38/00* (2006.01)
  *B32B 37/24* (2006.01)

(52) U.S. Cl.
  CPC ....... *B32B 2459/00* (2013.01); *Y10T 29/49826* (2015.01); *Y10T 442/3878* (2015.04); *Y10T 442/469* (2015.01)

(56) References Cited

U.S. PATENT DOCUMENTS

| | | | |
|---|---|---|---|
| 4,302,496 A | 11/1981 | Donovan | |
| 4,340,384 A | 7/1982 | Nomi | |
| 4,532,316 A | 7/1985 | Henn | |
| 4,925,732 A | 5/1990 | Driskill et al. | |
| 4,969,998 A | 11/1990 | Henn | |
| 5,155,867 A | 10/1992 | Norvell | |
| 5,539,072 A | 7/1996 | Wu | |
| 5,814,405 A | 9/1998 | Branca et al. | |
| 5,885,738 A | 3/1999 | Hannon | |
| 6,018,819 A | 2/2000 | King et al. | |
| 6,541,589 B1 | 4/2003 | Baillie | |
| 6,716,778 B1 | 4/2004 | Hottner | |
| 6,777,356 B2 | 8/2004 | Sadato et al. | |
| 7,306,729 B2 | 12/2007 | Bacino et al. | |
| 7,549,431 B1 | 6/2009 | Farnworth et al. | |
| 7,572,321 B2 | 8/2009 | Yamakawa et al. | |
| 7,704,598 B2 | 4/2010 | Jain et al. | |
| 2003/0054155 A1 | 3/2003 | Nomi et al. | |
| 2003/0130393 A1 | 7/2003 | Cavanaugh et al. | |
| 2007/0009679 A1 | 1/2007 | Holcombe et al. | |
| 2007/0272606 A1 | 11/2007 | Freese et al. | |
| 2009/0077724 A1 | 3/2009 | Courtney | |
| 2010/0129629 A1 | 5/2010 | Tee et al. | |

FOREIGN PATENT DOCUMENTS

| | | |
|---|---|---|
| EP | 0 890319 | 6/1998 |
| EP | 1 514484 | 9/2004 |
| EP | 1568485 | 8/2005 |
| EP | 2027996 | 2/2009 |
| JP | 57210073 | 12/1982 |
| JP | 5845037 | 3/1983 |
| JP | 61192827 | 12/1986 |
| JP | 2001011779 | 1/2001 |
| JP | 2001315236 | 11/2001 |
| JP | 2002240176 | 8/2002 |
| JP | 2005506405 | 2/2005 |
| JP | 2005246639 | 9/2005 |
| JP | 2007512987 | 5/2007 |
| KR | 20060043210 | 5/2006 |
| WO | 2006/124064 | 11/2005 |

OTHER PUBLICATIONS

PCT/US2010/001144, International Search Report, Aug. 26, 2010, 6 pages.

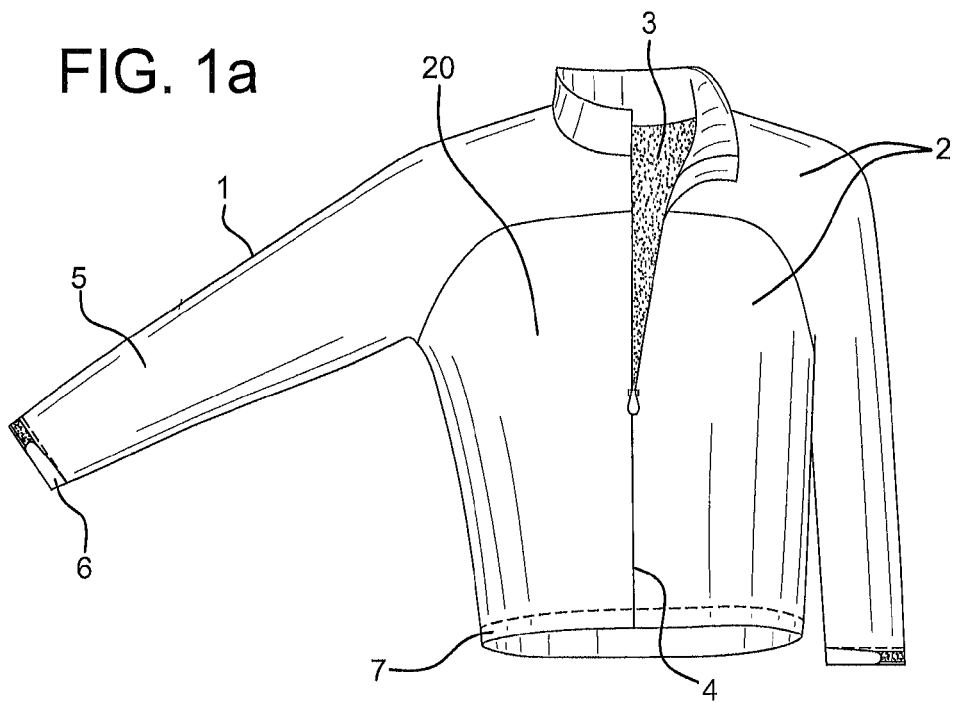
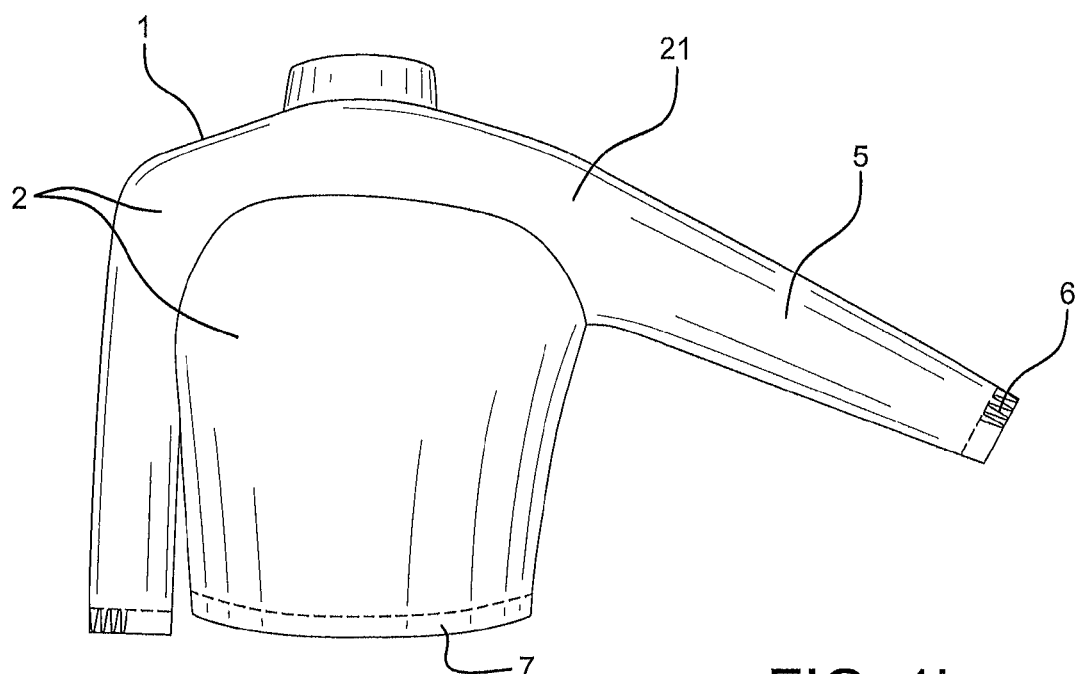

LIGHTWEIGHT, DURABLE APPAREL AND LAMINATES FOR MAKING THE SAME

CROSS REFERENCE TO RELATED APPLICATIONS

This application is a divisional of U.S. patent application Ser. No. 12/465,383 filed May 13, 2009, the entire contents of which are expressly incorporated herein by reference in its entirety.

FIELD OF THE INVENTION

Described herein is a breathable lightweight durable laminate having an outer film surface, and a lightweight durable article of apparel made from the laminate having an exterior film surface.

BACKGROUND OF THE INVENTION

Articles of apparel having film layers for providing water resistance or liquidproofness, while simultaneously providing breathability are known. Laminates and garments are constructed to provide protection to the film layer so as to resist tearing, damage by puncture or abrasion, and the like. Inner and outer fabric layers are most frequently added to both surfaces of the film to protect the film surface from damage.

Alternatively, garments having a film surface uncovered by a protective inner or outer layer of fabric are often constructed for use in combination with another garment whose fabric surface will provide protection to the film layer against damage. For example, an undergarment comprising a film composite lacking an outer protective fabric layer is constructed to be used under a separate outer garment where it is less susceptible to sustaining direct damage.

The addition of outer and inner fabric layers required to protect film layers from damage adds weight to an article of apparel, and results in materials having a higher water pickup on the outer surface. Moreover, wearing an outerwear garment to protect an undergarment having a film layer forms a bulky ensemble.

SUMMARY OF THE INVENTION

A lightweight laminate having an outer film surface is described. The lightweight laminate is sufficiently durable against abrasion for use in making articles of apparel, such as outerwear garments, having an exterior film surface that remains liquidproof after an abrasion challenge. The lightweight laminate has a porous polymer surface that can be colorized, for example, by printing. The laminate outer film surface can be coated with an oleophobic coating composition to provide oleophobicity.

A method of making a lightweight laminate having an abrasion resistant outer film surface is described. The method comprises the steps of selecting a textile layer; selecting a rugged porous fluoropolymer membrane; coating and colorizing the porous fluoropolymer membrane to form an oleophobic fluoropolymer film having an outer film surface; and laminating the textile and the porous fluoropolymer film to form a laminate, optionally before or after the coating step or the colorizing step to form a laminate having an outer film surface and an inner textile surface. In one embodiment, a laminate is formed having a moisture vapor transmission rate is greater than 1000 g/m$^2$/24 hours, a laminate mass per area less than 200 g/m$^2$, and the laminate outer film surface that is abrasion resistant, resulting in a durably liquidproof laminate.

A method of making an article of apparel, such as a lightweight outerwear garment, having an abrasion resistant durably liquidproof exterior film surface is described. The method comprises the steps of selecting a laminate having a woven or knit textile layer laminated to a porous fluoropolymer membrane; coating and colorizing the porous fluoropolymer membrane with an oleophobic polymer composition, optionally before or after the laminating step, thereby forming a laminate having an outer film surface and an inner textile surface; assembling an outerwear garment from the laminate so that the colorized outer film surface is the outerwear garment exterior film surface and the textile inner surface is on a side opposite the outer film surface.

DESCRIPTION OF THE DRAWINGS

The operation of the present invention should become apparent from the following description when considered in conjunction with the accompanying drawings, in which:

FIG. 1a is perspective view of one embodiment of a garment front surface.

FIG. 1b is perspective view of one embodiment of a garment back surface.

DETAILED DESCRIPTION OF THE INVENTION

Figure 2:
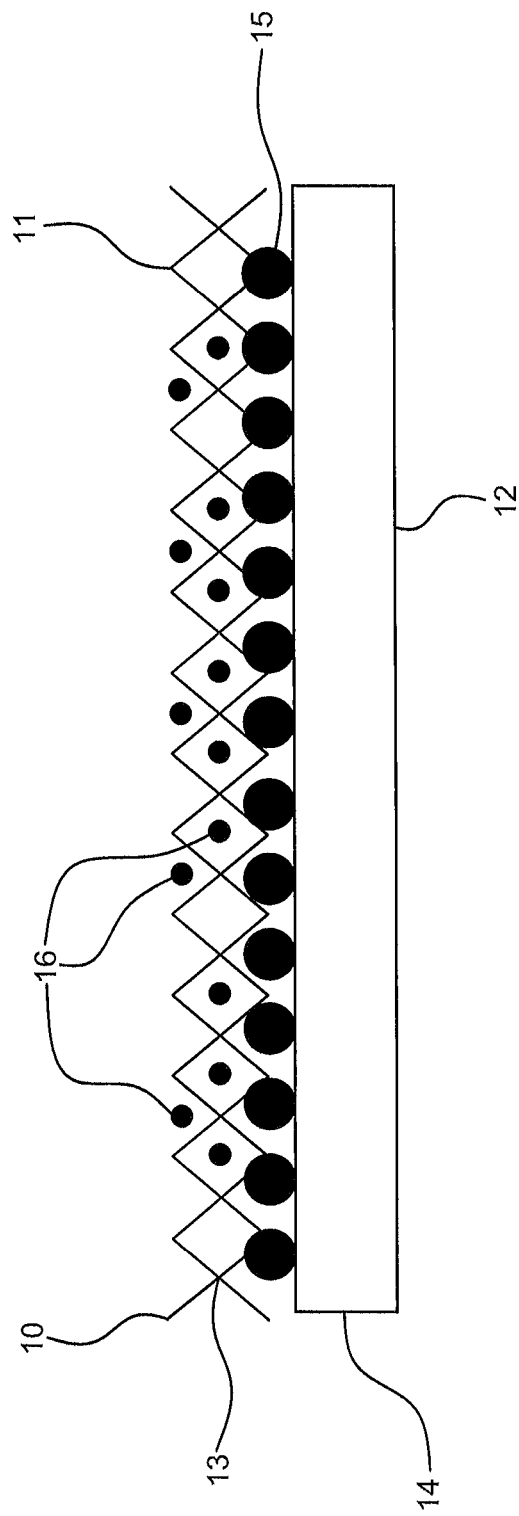
FIG. 2 is a perspective view of one embodiment of a laminate.

Described, herein, is a breathable lightweight, durable laminate for use in making liquidproof articles of apparel such as outerwear garments. The laminate is designed having a durably colorized outer film surface. A breathable lightweight, outerwear garment is described that comprises an exterior film surface that is resistant to abrasion and is therefore durably liquidproof, and has a printable non-textile exterior surface.

One embodiment, exemplified in FIGS. 1a and 1b, illustrate a perspective view of a garment (1) in the form of a jacket having a garment exterior non-textile surface on the garment front surface (20) and the garment back surface (21). The jacket (1) comprises an exterior non-textile surface (2) and an interior textile surface (3) that faces towards the body of a wearer. The jacket (1) comprises a front closure (4), sleeves (5) with wrist cuffs (6), and a waist band (7). The garment is formed from a laminate, exemplified in the cross-sectional illustration of FIG. 2. In one embodiment, the garment comprises a laminate (10) that comprises an outer film surface (11) and an inner textile surface (12). The laminate (10) comprises a porous membrane (13) adjacent to a textile layer (14). The porous membrane (13) may be colorized with a colorant (16) and/or an oleophobic composition, forming the outer film surface (11) of the laminate (10). The textile layer (14) is adjacent the porous membrane (13) on a side opposite the outer film surface (11) and is attached to the porous membrane by attachments (15), which are exemplified in FIG. 2 as discontinuous attachments.

It is desirable to make laminates having a film surface that can be durably coated, for example with colorants and oleophobic coatings. Where the membrane layer is a low surface energy film, such as many fluoropolymer materials, membrane porosity is helpful to achieve durable mechanical bonding of the coating compositions within the membrane structure. However, many porous films are known to abrade easily making it difficult to achieve durable liquidproofness using the porous films in applications that will subject them to abrasion. Laminates described herein have a film surface formed from membranes having sufficient porosity to provide a durable coating but that are resistant to abrasion maintaining liquidproofness.

The outer porous film surface (11) of the laminate (10) can be made, for example, from a porous membrane comprising polymeric materials such as fluoropolymers, polyolefins, polyurethanes, and polyesters. Suitable polymers may comprise resins that can be processed to form porous or microporous membrane structures. For example, polytetrafluoroethylene (PTFE) resins that can be processed to form stretched porous structures are suitable for use herein. For example, PTFE resins can be stretched to form microporous membrane structures characterized by nodes interconnected by fibrils when expanded according to the process taught in patents such as in U.S. Pat. Nos. 3,953,566, 5,814,405, or 7,306,729. In some embodiments, expanded PTFE fluoropolymer films are made from PTFE resins according to U.S. Pat. No. 6,541,589, having comonomer units of polyfluorobutylethylene (PFBE). For example, microporous expanded PTFE (ePTFE) fluoropolymers can comprise PTFE having from about 0.05% by weight to about 0.5% by weight of comonomer units of PFBE based upon the total polymer weight.

In one embodiment, the outer porous membrane (13) comprises ePTFE having a microstructure characterized by nodes interconnected by fibrils, wherein the pores of the porous film are sufficiently tight so as to provide liquidproofness and sufficiently open to provide properties such as moisture vapor transmission, and penetration by coatings of colorants and oleophobic compostions. For example, in some embodiments, it is desirable for the porous membranes to have an average median flow pore size of less than or equal to about 400 nm to provide water resistance, and a median flow pore size greater than about 50 nm for colorization. This may be accomplished by compounding a PTFE resin which is suited to produce a node and fibril microstructure upon stretching. The resin can be blended with an aliphatic hydrocarbon lubricant extrusion aid such as a mineral spirit. The compounded resin may be formed into a cylindrical pellet and paste extruded by known procedures into a desired extrudable shape, preferably a tape or membrane. The article can be calendered to the desired thickness between rolls and then thermally dried to remove the lubricant. The dried article is expanded by stretching in the machine and/or transverse directions, for example, according to the teachings of U.S. Pat. Nos. 3,953,566, 5,814,405, or 7,406,729, to produce an expanded PTFE structure characterized by a series of nodes which are interconnected by fibrils. The ePTFE article is then amorphously locked by heating the article above the crystalline melt point of PTFE, for example between about 343°-375° C.

Where laminates are described as durably liquidproof, it is meant that the laminate remains liquidproof after an abrasion challenge according to the Liquidproof After Abrasion test method described herein. In some embodiments, laminates that achieve durable liquidproofness comprise a textile laminated to a porous membrane that has a ball burst load greater than 17 $lb_f$, or greater than about 19 $lb_f$, when measured according to the Ball Burst load test described herein. In some embodiments, laminates that achieve good durable liquidproofness comprise a textile laminated to a porous membrane having certain properties when tested according to the Toughness, Maximum Load, MTS, and Modulus test described herein. For example, in some embodiments, laminates having a textile laminated to a porous membrane with an average maximum load (the average of the maximum load in the longitudinal and transverse directions) greater than 10N, or greater than 12N, or greater than 20N, are durably liquidproof. Suitable porous membranes may have an average modulus in the transverse and longitudinal direction of greater than about 40 MPa or greater than about 50 MPa, or greater than about 60 MPa. In some embodiments, durably liquidproof laminates comprise porous membranes having an average matrix tensile strength in the longitudinal and transverse direction of greater than 90 MPa, or greater than 95 MPa, or greater than 100 MPa, or greater than 150 MPa.

The porous node and fibril structure of an expanded fluoropolymer membrane enables coating materials and/or print materials to adhere to this porous substrate. Low surface energy fluoropolymer films, such as ePTFE, is known to repel most surface treatments, thereby providing a challenge for applying durable coatings, such as those comprising colorants. However, in one embodiment, a coating composition comprises a binder and a colorant to colorize a film surface used as the outer film surface of the laminate. The coating composition coats or encapsulates the nodes and/or fibrils of the expanded fluoropolymer structure forming a durable aesthetic appearance.

Membranes suitable for use as the outer film surface have a surface that when printed provides a durable aesthetic. Aesthetic durability can be achieved in some embodiments with colorant coating compositions that comprise a pigment having a particle size sufficiently small to fit within the pores of the porous substrate. Pigment particles having a mean diameter of less than about 250 nm are useful for forming durable color. Coating compositions may further comprise a binder capable of wetting the porous substrate and binding the pigment to the pore walls.

Multiple colors can be applied using multiple pigments, or varying the concentrations of one or more pigments, or by both techniques. In one embodiment, a laminate comprises an outer film surface and is colorized on more than 90% of the outer film surface by printing or other application technique, while retaining porosity and moisture vapor transmission. In one embodiment, the surface of the film can be colorized with a colorant to form a solid color or a pattern (design). Coating compositions comprising colorants can be applied to provide a variety of colors and designs, such as solid, camouflage and print patterns. Coating compositions may comprise one or more colorants suitable for use in printing camouflage patterns such as woodland and desert patterns. In one embodiment, a coating composition suitable for use in printing a woodlands camouflage pattern on to a surface of a porous film comprises black, brown, green, and light green colorant. In an alternate embodiment a coating composition comprises brown, khaki, and a tan colorant suitable for printing a desert camouflage pattern. Other embodiments comprise compositions comprising colorants having shade variations within these two examples.

The coating composition can be applied to the porous membrane, forming the porous outer film, by several methods. Application methods for colorizing include but are not limited to transfer coating, screen printing, gravure printing, ink-jet printing, and knife coating. Additional topical treatments can be applied to the porous membrane, provided sufficient porosity throughout the laminate is maintained to remain moisture vapor transmissive. Additional treatments may be provided that impart functionality, such as but not limited to oleophobicity. Examples of oleophobic coatings include for example, fluoropolymers such as fluoroacrylates and other materials such as those taught in U.S. patent application Ser. No. 11/440,870. When provided with an oleophobic coating, laminates are formed having an outer film surface with an oil rating greater than about 2 when tested according to the Oil Repellency Test described herein. In other embodiments, laminates may be formed wherein the outer film surface has an oil rating greater than or equal to about 4, or greater or equal to about 5, or greater or equal to about 6. Optionally, the outer porous film may comprise a discontinuous coating, for example, in the form of particulates or discrete elements to provide even further abrasion resistance. A coating of discrete materials may be sprayed or coated on the outer film surface, and may comprise, for example, polyurethane, epoxy, silicone, fluoropolymers and the like, for improving abrasion resistance of the laminate.

An aesthetically durable colorized film surface can be formed having a color change of less than 20 Delta-E (dE) when abrasion tested on the colorized outer film surface of the laminate according to the Color Change After Abrasion test described herein. Laminates can also be formed having an aesthetically durable film surface having a dE less than 15, or a dE less than 10.

The laminate further comprises a textile (14) bonded to the porous outer film (13) of the laminate (10) on a side opposite the outer film surface (11). The textile (14) can be selected to provide dimensional stability to the porous outer film (13) when formed as a laminate. Suitable lightweight textiles may comprise materials such as cotton, rayon, nylon and polyester, and blends thereof.

Coatings can also be provided to the textile (14) layer to impart a variety of properties to the laminate. For example, a colorant can be applied to the textile to colorize the layer in a solid or patterned color having one or more than one color. The textile and the membrane making up the outer film surface can be colorized by the same or different technique, and by the same or different color or pattern, as the outer film.

The porous membrane (13) layer forming the outer film surface (11) and the textile (14) are bonded together in a manner that maintains a desirably high level of moisture vapor transmission. In some embodiments, for example, to maximize air permeability and moisture vapor transmission rates, discontinuous adhesive attachments are used to join the layers. In other embodiments, the porous membrane (13) and the textile (14) can be laminated with a continuous adhesive, though it is desirable that the continuous adhesive layer is moisture vapor permeable, and the laminate has a moisture vapor transmission rate greater than about 2000 $g/m^2/24$ hours. Adhesive compositions include thermoset adhesives, such as polyurethane, and silicone. Thermoplastic adhesives include thermoplastic polyurethane. The porous membrane layer and the textile are attached by adhesive attachment through lamination processes, such as gravure lamination, spray adhesive bonding, and fusion bonding with a thermoplastic scrim to form the lightweight laminate.

Durably liquidproof laminates are abrasion resistant and do not leak after abrasion testing on the outer film surface of the laminate for greater than or equal to about 1400 abrasion movements when tested according to the Liquidproof (Suter) After Hook and Loop Abrasion test described herein. In other embodiments laminates are formed that remain liquidproof after 3000 abrasion movements on the outer film surface, or remain liquidproof after more than 4000 abrasion movements on the outer film surface, or remain liquidproof for more than 6000 abrasion movements on the outer film surface.

Moisture vapor transmission, or breathability, is important to provide cooling to a wearer of the outerwear apparel made from laminates described herein. Laminates described herein, are therefore breathable, having a moisture vapor transmission rate (MVTR) greater than 1000 $g/m^2/24$ hours, or greater than 2000 $g/m^2/24$ hours, or greater than 5000 $g/m^2/24$ hours, or greater than 10000 $g/m^2/24$ hours, or greater than 15000 $g/m^2/24$ hours, or greater than 20000 $g/m^2/24$ hours, when tested according to the method described. Lightweight laminates described herein can be formed having a mass per area less than about 400 $g/g^2m$, or mass per area less than about 350 $g/m^2$, or a mass per area less than about 200 $g/m^2$, or less than about 150 $g/m^2$, or less than about 145 $g/m^2$, or less than about 125 $g/m^2$, or less than about 100 $g/m^2$.

Laminates described herein having an outer film surface have low water pickup when compared, for example, to liquidproof laminates having an outer textile surface. In some embodiments the laminates described herein have a water pickup less than or equal to about 10 $g/m^2$ when tested according to the Water Pickup test described herein. In other embodiments, laminates are formed having a water pickup of less than or equal to about 8 $g/m^2$, or less than or equal to about 6 $g/m^2$, or less than or equal to about 4 $g/m^2$, or less than or equal to about 3 $g/m^2$.

A method is described for making lightweight laminates having an abrasion resistant outer film surface. The method comprises the steps of selecting a textile layer; selecting a porous fluoropolymer membrane having, for example, an average maximum load in the transverse and longitudinal direction of greater than 10; coating and colorizing the porous fluoropolymer membrane with an oleophobic polymer composition and a colorant to obtain a porous fluoropolymer film having an oleophobic colorized outer film surface with an oil rating greater than 2; and laminating the textile and the porous fluoropolymer film to form a laminate, optionally before or after the coating step or the colorizing step to form a laminate having an outer film surface and an inner textile surface. In one embodiment, the laminate has a moisture vapor transmission rate greater than 1000 $g/m^2/24$ hours, a mass per area less than 150 $g/m^2$, and the laminate outer film surface is abrasion resistant, remaining liquidproof after abrasion when abraded on the outer film surface.

A method is also described for making lightweight articles of apparel such as, an outerwear garment, having an abrasion resistant exterior film surface. The method comprises the steps of: selecting a textile layer and a porous fluoropolymer membrane; coating and colorizing the porous fluoropolymer membrane with an oleophobic polymer composition and a colorant to obtain an oleophobic colorized outer film surface with an oil rating greater than 2; laminating the textile and the porous fluoropolymer, optionally before or after the coating step or the colorizing step, and forming a laminate having an outer film surface and an inner textile surface that is opposite the outer film surface, wherein the laminate has a moisture vapor transmission rate greater than 1000 $g/m^2/24$ hours, and the laminate is abrasion resistant and durably liquidproof after abrasion testing on the outer film surface. The method further comprises the steps of assembling an outerwear garment from the laminate so that the colorized outer film surface is the outerwear garment exterior film surface.

Constructs made with the above described laminates include apparel such as outerwear garments, jackets, ponchos, raincoats, hats, hoods, gloves, pants, coveralls, and the like.

Test Methods

Mass Per Area

The mass per area of samples is measured according to the ASTM D 3776 (Standard Test Methods for Mass Per Unit Area (Weight) of Fabric) test method (Option C) using a Mettler-Toledo Scale, Model 1060. The scale is recalibrated prior to weighing specimens. Weights are recorded in ounces to the nearest half ounce. This value was converted to grams per square meter as reported herein.

Density for Membranes

To measure the density of the membrane material examples of the present invention and the comparative examples, property data measured on the samples were collected. As noted above, the 165 mm×15 mm samples were measured to determine their mass (using a Mettler-Toledo analytical balance model AB104) and their thickness (using a Kafer FZ1000/30 snap gauge). Using this data, a density can be calculated with the following formula:

$$\rho = \frac{m}{w*l*t}$$

where:
ρ=density (g/cc)
m=mass (g)
w=width (1.5 cm)
l=length (16.5 cm)
t=thickness (cm)

Thickness for Membranes

To measure the thickness of the membrane material examples of the present invention, a snap gauge (Kafer FZ1000/30) was used. Measurements were taken in at least four areas of each sample. The average value of these multiple measurements is reported as the thickness value for each membrane.

Gurley Air Flow

The air permeability of each sample was determined based on the time required to pass 50 cc of air through the sample according to FED-STD-191A Method 5452 with the following exception. This test methods was followed except that specimens were sealed prior to testing to ensure a good seal and no leakage around edges during the test.

Median Flow Pore Size Test

The average pore diameter of the porous membrane was reported as Median Flow Pore size (MFP). To determine MFP, a sample membrane having a 25 mm diameter was obtained and wetted with perflouropolyether. The wetted sample membrane was placed in a Coulter Porometer wherein the average pore diameter of the final product was determined.

Ball Burst Strength

The test method and related sample mounting apparatus were developed by W. L. Gore & Associates, Inc. for use with a Chatillon Test Stand. The test measures the burst strength of materials such as fabrics (woven, knit, nonwoven, etc.), porous or nonporous plastic films, membranes, sheets, etc., laminates thereof, and other materials in planar form.

A specimen was mounted taut, but unstretched, between two annular clamping plates with an opening of 7.62 cm diameter. A metal rod having a polished steel 2.54 cm diameter ball-shaped tip applied a load against the center of the specimen in the Z-direction (normal to the X-Y planar directions). The rod was connected at its other end to an appropriate Chatillon force gauge mounted in a Chatillon Materials Test Stand, Model No, TCD-200. The load was applied at the rate of 25.4 cm/minute until failure of the specimen occurred. The failure (tearing, burst, etc.) may occur anywhere within the clamped area. Results were reported as the average of three measurements of the maximum applied force before failure.

Testing was done at ambient interior temperature and humidity conditions, generally at a temperature of 21° C. to 24° C. and relative humidity of 35% to 55%. Ball burst data can be expressed as the ball burst strength as a function of mass per area of the sample; mass per area of the sample can be determined from the product of density and thickness of the sample.

Toughness, Maximum Load, MTS, and Modulus Test Method

Sample preparation was accomplished by using a die punch to cut 165 mm long by 15 mm wide rectangular samples out of the ePTFE membrane web. The membrane web was placed on the cutting table such that it was free from wrinkles in the area where the sample was to be cut. The 165 mm×15 mm die was then placed on the membrane (generally in the center 200 mm of the web) such that its long axis is parallel to the direction that will be tested. The directions quoted in this publication will be measured in the longitudinal direction (parallel to the direction of travel during processing) and the transverse direction (perpendicular to the direction of travel during processing). Once the die is aligned, pressure is applied to it to cut through the membrane web. Upon removal of this pressure, the rectangular sample for testing should be inspected to ensure it is free from edge defects which may impact the tensile testing.

At least 3 samples in the longitudinal (L) and in the transverse (T) directions should be cut to characterize the membrane web. Once samples have been prepared, they were measured to determine their mass (using a Mettler-Toledo analytical balance model AB104) and their thickness (using a Kafer FZ1000/30 snap gauge). Each sample was subsequently tested to determine its tensile properties using an Instron 5500 tensile tester running Merlin Series IX software (version 7.51). The samples were inserted into the tensile tester and held using Instron Catalog 2702-015 (rubber coated face plate) and 2702-016 (serrated face plate) grip plates such that each end of the sample is held between one rubber coated and one serrated face plate. The pressure applied to the grip plates was approximately 50 psi. The gauge length between the grips was set at 50 mm and the crosshead speed (pulling speed) was set to a speed of 508 mm/min. A 0.1 kN load cell was used to carry out these measurements and data was collected at a rate of 50 points/sec. The laboratory temperature should be between 68° F. and 72° F. to ensure comparable results. Finally, if the sample happened to break at the grip interface, the data was discarded.

At least 3 samples in the longitudinal and transverse directions should be successfully pulled (no slipping out of or breaking at the grips) in order to characterize the membrane web. The data analysis and calculations were performed with the Merlin software or any other data analysis package. First, the maximum load able to be supported by the sample during the tensile test for L and T directions was located. The maximum load for L and T was then normalized to the sample physical properties (thickness and density) via the following equation to calculate the matrix tensile strength for L and T directions.

$$MTS = F_{max} * \left(\frac{\rho_0 * l}{100 * m}\right)$$

where:
MTS=Matrix tensile strength (MTS) in Mpa
$F_{max}$=maximum load measured during test (Newtons)
$\rho_o$=theoretical density for PTFE (2.2 grams/cc)
l=sample length (cm)
m=sample mass (grams)

Then, the average maximum load was calculated by averaging the maximum load for L with the maximum load for T. The average matrix tensile strength was calculated by averaging the matrix tensile for L with the matrix tensile strength for T.

The toughness for each sample was determined by integrating the stress strain curve from the sample to calculate the area below the curve, and averaged for three measurements for each of the L and T directions. This number represents the energy required to break the sample, reported as the sample toughness. Then, the average toughness was calculated by averaging the toughness L with the toughness for T.

The modulus of each sample is determined by taking the slope from the linear elastic portion of the stress-strain curve. First, the modulus in the longitudinal (L) and transverse (T) directions are calculated from the average of three measurements. Then, the average modulus is calculated by averaging the modulus of L with the modulus of T.

Oil Repellency Test

In these tests, oil rating was measured using the AATCC Test Method 118-1983 when testing the outer most film side of laminate samples. Three drops of the test oil are placed on the sample surface. A glass plate is placed directly on top of the oil drops. After 3 minutes, the glass plate is removed and any excess oil blotted off the surface. The film side of the sample is visually inspected for a change in appearance indicating penetration or staining by the test oil. The oil rating corresponds to the highest number oil that does not cause visible staining on the film sample side being tested.

Moisture Vapor Transmission Rate Test (MVTR)

The moisture vapor transmission rate for each sample was determined in accordance with ISO 15496 except that the sample water vapor transmission (WVP) was converted into MVTR moisture vapor transmission rate (MVTR) based on the apparatus water vapor transmission (WVPapp) and using the following conversion.

$$MVTR=(Delta\ P\ value*24)/((1/WVP)+(1+WVPapp\ value)))$$

Air Permeability

The air permeability for each laminate sample was determined in accordance with ASTM D737 using the standard pressure drop of 125 Pa, but with the following apparatus modification. An alternate test head area having an area of 20 cm$^2$ was used. The test apparatus used was an FX 3300-20 available from Advanced Testing Instruments of Schwerzenbach, Switzerland. The values, reported in cubic feet per minute, are shown in Table 3.

Water Pick Up Test

An 8"×8" square sample is weighed using a calibrated scale that reads to the nearest 0.1 mg, available from Mettler Toledo of Columbus, Ohio, product item number AG104. The sample is then placed in a hydrostatic tester of the sort described in ASTM D751 "Standard Test Methods for Coated Fabrics" section 41 through 49 "Hydrostatic Resistance Procedure B" with a 4.25" diameter circle challenge area. The sample is placed so that the laminate surface that was designed as the outer facing surface is challenged by the water, at 0.7 psi for 5 minutes. Take care to ensure that no residual water adheres or is absorbed by the back side of the sample during placement or removal, as this will alter the reading. After exposure, the sample is removed from the tester and weighed again on the aforementioned scale. All weight gain is assumed to be from water absorbed in the challenge area of 4.25" diameter circle because of the high clamp pressure used to hold the sample in place. The water pickup is based on this area using the following calculation to convert to grams per square meter.

$$Water\ pick\ up=(final\ sample\ weight-initial\ sample\ weight)/((4.25\ inch*0.0254\ m/inch/2)^{2}*\pi).$$

Liquidproof Test (Suter)

Liquidproof testing was conducted as follows. Laminates were tested for liquidproofness by using a modified Suter test apparatus with water serving as a representative test liquid. Water is forced against a sample area of about 4¼-inch diameter sealed by two rubber gaskets in a clamped arrangement. Samples are tested by orienting the sample so that the outer film surface of the sample is the surface against which water is forced. The water pressure on the sample is increased to about 1 psi by a pump connected to a water reservoir, as indicated by an appropriate gauge and regulated by an in-line valve. The test sample is at an angle, and the water is recirculated to assure water contact and not air against the sample's lower surface. The surface opposite the outer film surface of the sample is observed for a period of 3 minutes for the appearance of any water which would be forced through the sample. Liquid water seen on the surface is interpreted as a leak. A passing (liquidproof) grade is given for where no liquid water is visible on the sample surface within 3 minutes. A sample is "liquidproof" as used herein, if it passes this test. Samples having any visible liquid water leakage, e.g. in the form of weeping, pin hole leak, etc. are not liquidproof and fail the test.

Hydrostatic Resistance—Initial

The initial hydrostatic resistance of each sample was determined in accordance with ASTM D751 "Standard Test Methods for Coated Fabrics." The pressure was increased until the sample ruptured. The hydrostatic resistance reported was the hydrostatic pressure value at which the sample ruptured. This value was reported in pounds per square inch (psi).

Hook and Loop Modified Abrasion

Abrasion was tested as per ASTM D4966, "Standard Test Method for Abrasion Resistance of Textile Fabrics (Martindale Abrasion Tester Method)" using a Martindale Abrasion test apparatus with the following modifications. A 6.25" diameter circle specimen was placed over the standard piece of felt on the testing table face up, so the film surface of the sample is subject to abrasion challenge. The specimen in the specimen holder was replaced by a 1.5" diameter circle of the hook side of hook and loop fastener with the hooks facing down so that they challenge the sample. This material is nylon hook obtainable from Norman Shatz Co. of 3570 East Street Road, Bensalem, Pa. 19020 as "Two inch wide Black Hook".

Abrasion movements were conducted at regular intervals with color change and/or hydrostatic resistance measurements made at the end of each movement interval. Initially, the movement interval is 400 movements until 2400 movements are reached. After this, the movement interval jumped to 800 movements until 9600 movements are reached. After this, the movement interval jumped to 1600 movements for the remainder of the test. Sample testing for all samples was stopped at 16000 movements.

Color Change after Hook and Loop Modified Abrasion

After each abrasion movement interval the sample is removed from the above described Martindale test table and its performance is evaluated. An L*a*b* reading of the middle of the sample was taken using an X-Rite i1 Basic spectrophotometer (X-Rite World Headquarters in Grand Rapids, Mich. or www.xrite.com). The difference between this "after abrasion" reading and the initial reading taken in the same spot but prior to any abrasion movements is calculated. To determine the color change at each abrasion movement interval, the root mean square of this difference value is calculated using the equation below.

Color change=((movement $L^*$reading−initial $L^*$reading)$^2$+(movement $a^*$reading−initial $a^*$reading)$^2$+(movement $b^*$reading−initial $b^*$reading)$^2$)$^{1/2}$ This root mean square of the color change value is reported in units of delta E (dE).

Liquidproof (Suter)—after Hook and Loop Modified Abrasion

The liquidproofness of each sample after any given abrasion movement interval was determined using the "Liquidproof Test based on Suter Method" described above. A sample is no longer liquidproof when any visible water leakage, such as weeping, pin hole leak etc., is observed. No further abrasion or liquidproof testing conducted on the sample.

Hydrostatic Resistance after Hook and Loop Modified Abrasion

The hydrostatic resistance after abrasion was determined in accordance with ASTM D751 "Standard Test Methods for Coated Fabrics" with the following exception. Each test specimen was abraded in accordance with the previously mentions Hook and Loop Modified Abrasion Method, however, samples were abraded for 1,000 movements using the hook side of the hook and loop fastener as the abradant. Each specimen was then be tested for hydrostatic resistance in accordance with ASTM D 751 oriented so that the outer film surface facing the water. These values are reported in pounds per square inch (psi).

EXAMPLES

Two layer laminates were formed having an outer film surface and an inner textile surface described according to the following examples, Membrane 1 (M1)

A moisture vapor permeable, microporous polytetrafluoroethylene (PTFE) membrane was produced that was produced from a PTFE resin made according to the teachings of U.S. Pat. No. 6,541,589. The PTFE resin comprised about 0.5 wt % polyfluorobutylethylene (PFBE) based on the total resis weight, and was processed into an expanded PTFE (ePTFE) membrane according to the teachings of U.S. Pat. No. 3,953,566. Properties for this membrane are detailed in Table 1.

Membrane 2 (M2)

A moisture vapor permeable, microporous PTFE membrane was produced from PTFE resin and processed into an expanded polytetrafluoroethylene (ePTFE) membrane according to the teachings of U.S. Pat. No. 5,814,405. Properties for this membrane are detailed in Table 1.

Membrane 3 (M3)

A moisture vapor permeable, microporous PTFE membrane was produced from PTFE resin and processed into an expanded polytetrafluoroethylene (ePTFE) membrane according to the teachings of U.S. Pat. No. 3,953,566. Properties for this membrane are detailed in Table 1.

Membrane (M4)

A moisture vapor permeable, microporous membrane was produced from PTFE resin and processed into an expanded polytetrafluoroethylene (ePTFE) microporous membrane according to the teachings of U.S. Pat. No. 3,953,566. The properties for this membrane are detailed in Table 1.

Membrane 5 (M5)

A microporous membrane produced from PTFE resin processed into an expanded microporous polytetrafluoroethylene (ePTFE) membrane according to the teachings of U.S. Pat. No. 3,953,566. The properties of this membrane having the properties detailed in Table 1.

TABLE 1

Properties of Porous Membranes

| Membrane | M1 | M2 | M3 | M4 | M5 |
| --- | --- | --- | --- | --- | --- |
| Mass/area (g/m$^2$) | 20 | 20 | 55 | 18 | 6 |
| Density (g/cm$^3$) | 0.66 | 0.97 | 0.54 | 0.46 | 0.56 |
| Thickness (μm) | 30 | 20 | 100 | 39 | 10 |
| Gurley (s) | 21 | 113 | 22 | 10 | 4 |
| Median flow pore diameter (nm) | 200 | 113 | 285 | 250 | 214 |
| Ball burst load (lbf) | 20 | 28 | 33 | 17 | 5 |
| Maximum load (L/T/average) (N) | 8/19/14 | 16/27/22 | 24/29/27 | 6/13/10 | 4.0/3.2/3.6 |
| Modulus (L/T/average) (MPa) | 29/158/94 | 160/319/240 | 46/57/51 | 12/68/40 | 60/22/41 |
| MTS (L/T/average) (MPa) | 55/145/100 | 117/205/161 | 64/78/71 | 50/106/78 | 100/79/90 |
| Toughness (L/T/average) (MPa) | 24/20/22 | 41//42/42 | 30/23/26 | 19/13/16 | 14/14/14 |

Textile 1 (T1)

A woven polyester textile was provided that was comprised of yarns and weighing about 80 g/m$^2$ available from Milliken & Company (Spartanburg, S.C.; style number 141125.)

Textile 2 (T2)

A woven nylon 6,6 textile was provided that was comprised of yarns and weighing about 50 g/m$^2$ available from Milliken & Company (Spartanburg, S.C.; style number 131907.)

Textile 3 (T3)

A knit textile was provided that was comprised of polyester in the form of a flat warp knit having a weight of approximately 38 gsm, from Glen Raven, Inc. (Glen Raven, N.C.; part number A1012.)

Colorization Method 1 (Blue)

After lamination, the ePTFE membrane surface of the two layer laminate was printed using a blue colored, solvent-based, pigment-containing ink capable of wetting the ePTFE. The laminate was printed using an Epson solvent capable, ink-jet printer to form a colorized outer film surface.

Colorization Method 2 (Red)

After lamination, the ePTFE membrane surface of the two layer laminate was printed using a red colored, solvent-based, pigment-containing ink capable of wetting the ePTFE. The laminate was printed using an Epson solvent capable, ink-jet printer to form a colorized outer film surface.

Oleophobic Coating 1 (C1)

The colorized, ePTFE outer film surface of the laminate was coated with 2-propanol (Sigma-Aldrich Chemical Corporation, St. Louis, Mo.) so that the film was completely wet. After wetting, it was immediately (in less than about 30 seconds) coated with a fluoropolymer solution, formulated by mixing about 6.0 g of fluorocarbon (AG8025, Asahi Glass, Japan) in about 14.0 g of deionized water. The colorized film surface was hand coated with the mixture using a roller to a coating weight of approximately 3 g/m². The coated film was cured at 180° C. for 2 minutes.

Oleophobic Coating 2 (C2)

The colorized, ePTFE outer film surface of the laminate was rendered oleophobic by coating with about 2.5% solution of Teflon® AF (DuPont Fluoropolymers, Wilmington, Del.) in Fluorinert FC-40 (3M Corporation, Minneapolis, Minn.) solvent. The colorized film surface was hand coated using a roller to a coating weight of approximately 3 g/m², and dried at 180° C. for about 2 minutes.

Examples 1-14

Laminates were formed comprising an outwardly facing colorized outer film surface and a textile.

Laminate samples for Examples 1-14 were constructed using the specific porous membrane and textile detailed in Table 2. The porous film and textile were laminated together by gravure printing a dot pattern of moisture curable polyurethane adhesive onto the membrane surface. The adhesive was prepared according to the teachings of U.S. Pat. No. 4,532,316, covering approximately 35% of the membrane surface. The adhesive-printed side of the ePTFE membrane was pressed to one side of the woven textile in a nip roll and then passed over a heated roll to form a two layer laminate. The moisture cure adhesive was allowed to cure for 48 hours.

The laminates were colorized according to the specific colorization and oleophobic coating methods in accordance to Table 2.

TABLE 2

Description of Laminate Examples

| Example Number | Membrane | Textile | Colorization | Coating |
|---|---|---|---|---|
| 1 | M1 | T1 | Blue | C2 |
| 2 | M2 | T1 | Red | C1 |
| 3 | M1 | T2 | Blue | C1 |
| 4 | M2 | T3 | Blue | C1 |
| 5 | M2 | T3 | Blue | C2 |
| 6 | M3 | T1 | Blue | C1 |
| 7 | M3 | T1 | Blue | C2 |
| 8 | M2 | T2 | Blue | C1 |
| 9 | M2 | T1 | Blue | C1 |
| 10 | M2 | T1 | Blue | C2 |
| 11 | M4 | T1 | Blue | C1 |
| 12 | M4 | T1 | Blue | C2 |
| 13 | M5 | T1 | Blue | C1 |
| 14 | M5 | T1 | Blue | C2 |

Laminates were formed that were lightweight, moisture vapor permeable, air permeable, having an oil rating of 5 or greater and low water pickup, when tested according to the methods described herein. The results are reported in Table 3.

To compare the low water pickup of laminates having an outer film surface to materials that are liquidproof but having a textile outer surface, a comparative material sample was obtained. Comparative Sample 1 was a commercially available material comprising a nylon textile (tightly woven) having a microporous polyurethane on one side and a durable water repellant (DWR) coating on the other side. Comparative sample 1 was tested for water pickup on the DWR side of the sample, and had a water pickup of about 11 gsm, significantly higher than water pickup of Examples 1-11 reported in Table 3.

TABLE 3

Laminate Characteristics

| Example number | Mass/area (g/m²) | Oil rating | MVTR (g/m²/24 hr) | Air permeability (ft³/min) | Water pickup (g/m²) |
|---|---|---|---|---|---|
| 1 | 112 | 5 | 22,550 | 0.007 | 2.1 |
| 2 | 122 | 5 | 5,010 | 0.001 | 1.2 |
| 3 | 96 | 5 | 8,040 | 0.003 | 3.1 |
| 4 | 91 | 6 | 19,110 | 0.005 | 1.1 |
| 6 | 173 | 6 | 23,430 | 0.02 | 4.1 |
| 8 | 107 | 5 | 15,800 | 0.01 | 2.9 |
| 9 | 144 | 6 | 5,630 | 0.001 | 2.1 |
| 11 | 151 | 6 | 20,990 | 0.007 | 6.9 |
| 13 | 114 | 6 | 16,200 | 0.007 | leak |

The laminates were tested for liquidproofness after abrasion, and for hydrostatic resistance before and after abrasion, as described in the test methods herein. The results are reported in Table 4.

TABLE 4

Laminate Liquidproofness and Hydrostatic Resistance Results

| | Abrasion Effect on Liquidproofness | | Abrasion Effect on Hydrostatic Resistance | |
|---|---|---|---|---|
| | Abrasion | Abrasion | | |
| Example Number | Movements With No Leakage (movements) | Movements At Failure (movements) | Initial (psi) | After abrasion (psi) |
| 1 | 3600 | 4400 | — | — |
| 2 | 4400 | 5200 | — | — |
| 3 | 3800 | 4400 | — | — |
| 4 | 1400 | 1800 | 82 | 78 |
| 5 | — | — | 80 | 75 |
| 6 | 9200 | 9600 | 52 | 73 |
| 7 | — | — | 59 | 80 |
| 8 | 11600 | 12000 | — | — |
| 9 | 6800 | 7600 | 130 | 166 |
| 10 | — | — | 131 | 167 |
| 11 | 1200 | 1600 | 115 | 149 |
| 12 | — | — | 130 | 155 |
| 13 | failed at first interval | 400 | 95 | 0 |
| 14 | — | — | 135 | 0 |

The laminate of Example 1 was tested for the durability of the aesthetic appearance by testing according to the method for Color Change After Abrasion described, herein. After abrasion on the outer film surface, the laminate had a color change of about 8 dE.

Example 15

An outwear jacket having an exterior film surface was constructed using a simple garment pattern having no pockets or hood, and a full length front zipper (4), as exemplified in FIGS. 1a and 1b.

A laminate was constructed comprising an ePTFE outer film surface similar to that of Example 3 except laminated to a knit textile layer, rather than the woven textile of Example 3, by discontinuous adhesive attachments. An oleophobic coating was applied to the outer film surface. The garment sleeves were terminated with elastic cuffs having adjustable hook and loop tabs. The bottom circumferential hem was provided with an elastic draw cord in order to accommodate a range of waist sizes.

The jacket was constructed sewing the patterned laminate pieces together by orienting the outer film surface to the exterior side of the jacket using a single needle seam machine having a 65 ball point needle. The sewing machine included a knife edge which trimmed off any excess laminate so that the seam could later be sealed using a narrow seam tape. The jacket seams were sealed with a hot-melt seam tape having a sufficiently low melt-viscosity such that the adhesive can penetrate through the knit fabric, contacting the ePTFE membrane to make a water tight seam, using a standard hot-melt seam sealing machine. The seam seal tape was applied to the knit textile side of the jacket laminate.

The back flap along the inside edge of the front zipper was reinforced with sheet adhesive, thereby preventing it from being caught in the zipper. The resulting garment was a men's size XL having a total garment weight of approximately 9.1 ounces.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An outerwear garment comprising:
a laminate comprising:
a first layer comprising a porous polytetrafluoroethylene (PTFE) membrane having an oleophobic outer film surface and an inner film surface opposing said outer film surface, said porous PTFE membrane having an average ball burst load greater than 17 lb force; and
a second layer comprising a knit textile bonded to said inner film surface of said porous PTFE membrane,
wherein said laminate is oriented in said garment such that said outer film surface of said porous PTFE membrane faces the environment and said knit textile faces a wearer of said outerwear garment,
wherein said laminate is liquidproof after more than 6000 abrasion movements on the outer film surface when tested according to the Liquidproof (Suter) After Hook Abrasion Test,
wherein said laminate has a moisture vapour transmission rate (MVTR) greater than 10,000 g/m$^2$/24 hours,
wherein said porous PTFE membrane has an average maximum load in the transverse and longitudinal direction greater than 10 N,
wherein said porous PTFE membrane has an average modulus in the transverse and longitudinal direction greater than 40 MPa, and
wherein said porous PTFE membrane has an average matrix tensile strength in the longitudinal and transverse direction greater than 90 MPa.

2. The outerwear garment of claim 1, wherein said porous PTFE membrane has a mass per area between 19 g/m$^2$ and 60 g/m$^2$.

3. The outerwear garment of claim 2, wherein said laminate has an average maximum load in the transverse and longitudinal direction greater than 10 N,
wherein said porous PTFE has an average modulus in the transverse and longitudinal direction greater than 40 MPa, and
wherein said porous PTFE has an average matrix tensile strength in the longitudinal and transverse direction greater than 90 MPa.

4. The outerwear garment of claim 1, wherein said laminate has a mass per area less than 200 g/m$^2$ and a water pickup less than or equal to about 6 g/m$^2$.

5. The outerwear garment of claim 1, wherein said laminate has a mass per area less than 125/m$^2$ and a water pickup less than or equal to about 4 g/m$^2$.

6. The outerwear garment of claim 1, wherein said outer film surface is colorized and has a Delta-E less than 15.

7. The outerwear garment of claim 1, wherein said laminate has a mass per area less than 200/m$^2$,
wherein said outer film surface is colorized and has a Delta-E less than 15,
wherein said porous PTFE has an average maximum load in the transverse and longitudinal direction greater than 20 N,
wherein said porous PTFE has an average modulus in the transverse and longitudinal direction greater than 60 MPa, and
wherein said porous PTFE has an average matrix tensile strength in the longitudinal and transverse direction greater than 150 MPa.

8. An outerwear garment comprising:
a laminate comprising:
a first layer comprising a porous polytetrafluoroethylene (PTFE) membrane having an oleophobic outer film surface and an inner film surface opposing said outer film surface; and
a second layer comprising a knit textile bonded to said inner film surface of said porous PTFE membrane,
wherein said laminate is oriented in said outerwear garment such that said outer film surface of said porous PTFE membrane faces the environment and said knit textile faces a wearer of said garment,
wherein said porous PTFE membrane has an average ball burst load greater than 17 lb force,
wherein said porous PTFE membrane has an average maximum load in the transverse and longitudinal direction greater than 10 N,
wherein said porous PTFE membrane has an average modulus in the transverse and longitudinal direction greater than 40 MPa,
wherein said porous PTFE membrane has an average matrix tensile strength in the longitudinal and transverse direction greater than 90 MPa,
wherein said laminate has a mass per area less than 400 g/m$^2$,
wherein said laminate is liquidproof after more than 6000 abrasion movements on the outer film surface when tested according to the Liquidproof (Suter) After Hook Abrasion Test, and
wherein said laminate has a moisture vapour transmission rate (MVTR) greater than 20,000 g/m$^2$/24 hours.

9. The outerwear garment of claim 8, wherein said porous PTFE membrane has an average ball burst load greater than 19 lb force,
wherein said porous PTFE membrane has an average maximum load in the transverse and longitudinal direction greater than 20 N,
wherein said porous PTFE membrane has an average modulus in the transverse and longitudinal direction greater than 60 MPa, wherein said porous PTFE membrane has an average matrix tensile strength in the longitudinal and transverse direction greater than 100 MPa.

10. The outerwear garment of claim 9, wherein said outer film surface is colorized and has a Delta-E less than 15.

11. The outerwear garment of claim 9, wherein said porous PTFE membrane has an average toughness from 22 MPa to 42 MPa.

12. The outerwear garment of claim 9, said laminate has a mass per area less than 125 g/m$^2$.

13. The outerwear garment of claim 1, wherein said laminate has a mass per area less than 400 g/m$^2$.

* * * * *